(12) United States Patent
Smith

(10) Patent No.: US 7,100,458 B2
(45) Date of Patent: Sep. 5, 2006

(54) FLEXURE SYSTEM FOR STRAIN-BASED INSTRUMENTS

(75) Inventor: Christopher P. Smith, Woodstock, GA (US)

(73) Assignee: Crane Nuclear, Inc., Kennesaw, GA (US)

(*) Notice: Subject to any disclaimer, the term of this patent is extended or adjusted under 35 U.S.C. 154(b) by 36 days.

(21) Appl. No.: 10/849,429

(22) Filed: May 19, 2004

(65) Prior Publication Data

US 2005/0000304 A1 Jan. 6, 2005

Related U.S. Application Data

(60) Provisional application No. 60/472,757, filed on May 22, 2003.

(51) Int. Cl.
*G01L 1/04* (2006.01)

(52) U.S. Cl. ............................... 73/862.637
(58) Field of Classification Search ............ 73/862.65, 73/862.66, 862.621–862.642; 177/211
See application file for complete search history.

(56) References Cited

U.S. PATENT DOCUMENTS

| | | | |
|---|---|---|---|
| 2,597,751 A | 5/1952 | Ruge | |
| 3,577,779 A * | 5/1971 | Laimins | 73/862.633 |
| 4,066,140 A * | 1/1978 | Conley | 177/134 |
| 4,186,596 A | 2/1980 | Bohringer et al. | |
| 4,364,279 A | 12/1982 | Stern et al. | |
| 4,459,863 A * | 7/1984 | Nordstrom | 73/862.634 |
| 4,546,838 A * | 10/1985 | Ormond | 177/211 |
| 4,856,327 A | 8/1989 | Branam et al. | |
| 4,911,004 A | 3/1990 | Leon | |
| 4,921,396 A * | 5/1990 | Asakawa et al. | 414/751.1 |
| 4,930,228 A | 6/1990 | Anderson et al. | |
| 4,936,150 A | 6/1990 | Burke et al. | |
| 5,065,129 A * | 11/1991 | Hellwig et al. | 338/4 |
| 5,123,283 A | 6/1992 | Duff et al. | |
| 5,142,906 A | 9/1992 | Smith | |
| 5,199,301 A | 4/1993 | Bauer | |
| 5,228,527 A * | 7/1993 | Kroll et al. | 177/211 |
| 5,546,817 A | 8/1996 | Heiman | |
| 5,955,679 A | 9/1999 | Leon | |
| 6,138,505 A | 10/2000 | Miyazaki | |
| 6,240,789 B1 | 6/2001 | Morlan et al. | |
| 6,898,989 B1 * | 5/2005 | Norling et al. | 73/862.637 |

* cited by examiner

*Primary Examiner*—Max Noori
(74) *Attorney, Agent, or Firm*—Womble Carlyle Sandridge & Rice, PLLC

(57) ABSTRACT

A device for measuring forces on a sensor body, comprising a beam. An array comprising at least one recess is formed in the beam. The array has a length-to-height ration of less than 1.0. At least one strain transducer is mounted in at least one recess, wherein when incorporated in a sensor body the device is sufficiently rigid to provide low overall deflection while providing adequately high metric strain levels.

7 Claims, 4 Drawing Sheets

FLEXURE SYSTEM FOR STRAIN-BASED INSTRUMENTS

RELATED APPLICATIONS

This application is a non-provisional application of and claims benefit of Provisional application No. 60/472,757, filed May 22, 2003, the content of which is incorporated herein in its entirety.

FIELD OF THE INVENTION

The present invention relates generally to force, torque, and deflection measuring devices, and more particularly to improved constructions for such devices. More particularly, the present invention is directed to compact, high-stiffness strain element systems having small length-to-height ratios to provide high metric strain levels for small deflections.

BACKGROUND OF THE INVENTION

Strain-based force, torque, and displacement instruments have conventionally included strain elements, in the form of flexures, columns, diaphragms, or shear panels. These elements react to stresses caused by tension, compression, bending, torsion, or shear. One objective of such devices has been to produce the required levels of strain in the element to actuate a strain-measuring transducer, such as a bonded resistance strain gage, while maintaining a minimum of strain and deflection in the overall structure; i.e., a high level of sensitivity to load. A further objective has been to provide compact and potentially miniature structures that incorporate adequate strain elements. Devices of the shear-panel element type have been constructed with round or rectangular blind cavities located transversely in a beam structure, leaving a thin shear panel to react to stresses as the beam is stressed. FIGS. 1 through 4 are illustrative of the prior art constructions currently in use. While these instruments have been both successful and economical, they have been limited in compactness and stiffness.

Thus, there exists a need for a compact strain-based measurement device that provides high sensitivity (high surface and strain levels) at very low levels of actuating deflection.

SUMMARY OF THE INVENTION

The present invention is directed to a compact, high-stiffness, high-sensitivity device for measuring forces or deflections acting on a sensor structure in at least one axis. An object of the embodiments of the present invention is that the structure of the device can be constructed to be much smaller, or shorter, in the length direction than known conventional sensors intended for similar use.

The specification and drawings of U.S. Provisional Application No. 60/472,757, filed May 22, 2003, are hereby incorporated by reference in their entirety.

In one embodiment, the device comprises a frame and an array of recesses formed in the frame, wherein the array of recesses has a length-to-height ratio significantly less than 1.0. This configuration allows the overall length of the element portion of the device to be significantly less than in a conventional single-element shear-panel design. The recesses are formed as blind cavities from each side to provide thin shear surfaces. A strain gage or similar transducer is mounted in at least one of the recesses, wherein when the element is incorporated in a sensor body, the device is sufficiently rigid to measure high strain levels under low deflection loads. Such devices are most suited to applications where a high level of strain corresponding to relatively small displacements is required.

In another embodiment, a compact, high-stiffness, high-sensitivity device is provided for measuring forces in frame members having a primary axis. This device comprises a clevis having a base and a pair of substantially parallel arms. An array of recesses is formed in each one of the pair of arms, each array of recesses having a length-to-height ratio of less than 1.0. At least one strain gage or similar transducer is mounted in at least one of the recesses in each array. When mounted to an axially-loaded member, the device is sufficiently rigid to measure high strain levels with low deflections.

In yet another embodiment, a compact, high-stiffness, high sensitivity device is provided for measuring forces of deflection in frame members. This device comprises a frame having a base and multiple spaced-apart arms integrally formed with and extending outwardly from the base. An array of recesses is formed in at least one of the arms, the array of recesses having a length-to-height ratio of less than 1.0. Depending upon the specific application, the arm in which the array is formed may extend outwardly at a perpendicular or oblique angle as defined by the vertical axis of the base and the axis formed by the lower surface of the arm. When mounted to a frame assembly, the device is sufficiently rigid to measure high strain levels with low deflections.

In a fourth embodiment, a high-stiffness, high sensitivity device is provided for measuring torque in axial members, such as pump shafts. This device comprises a wheel having inner and outer concentric rings, the inner and outer rings interconnected by a plurality of radially extending spokes. A recess is formed in at least two of the spokes, each recess having a length-to-height ratio of less than 1.0. At least one shear strain element is mounted in at least two of the recesses. As used to measure torque, the inner ring is mounted about the axial member to be measured and the outer ring is mounted to a load source.

These and other aspects of the present invention will become apparent to those skilled in the art after a reading of the following description of the described embodiments when considered in conjunction with the drawings. It should be understood that both the foregoing general description and the following detailed description are exemplary and explanatory only and are not restrictive of the invention as claimed.

DESCRIPTION OF THE PREFERRED EMBODIMENT

The present invention is directed to a high-stiffness, high-sensitivity device for measuring forces or deflections imposed on a sensor body. While several possible embodiments of the present invention are described herein, those skilled in the art will appreciate, upon reviewing the aspects of the disclosed constructions, that there are numerous constructions and configurations of the device which may be devised may be developed having the high-stiffness and high-sensitivity dimensions disclosed herein.

Figure 5:
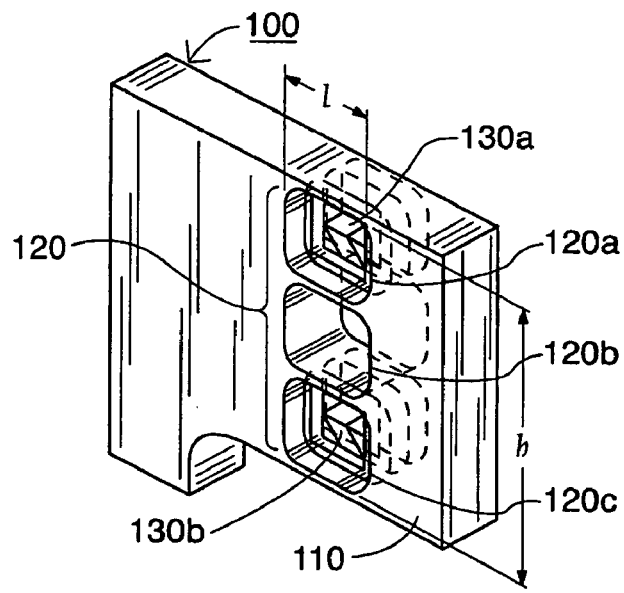
FIG. 5 illustrates one embodiment of the present invention configured for single-axis measurement with high sensitivity and stiffness and low deflection in the primary load axis.
Figure 6:
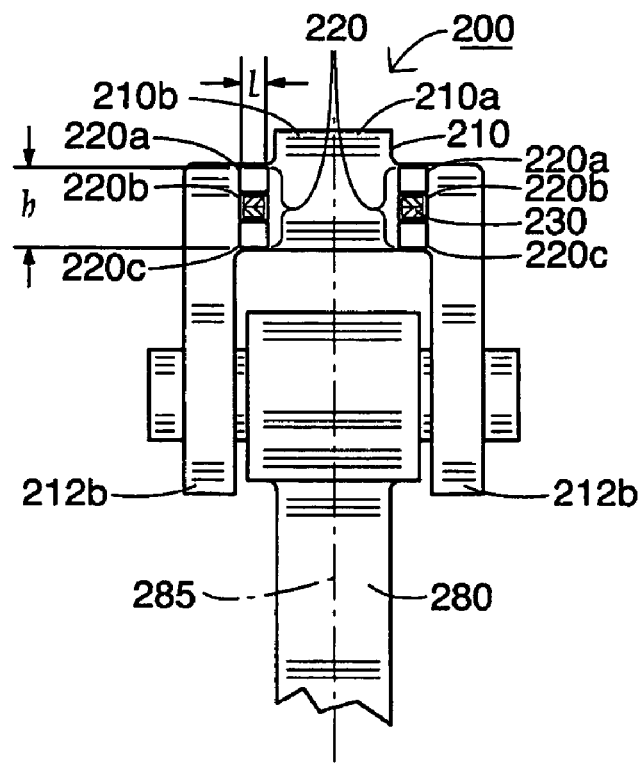
FIG. 6 depicts a second embodiment of the present invention configured for high sensitivity and stiffness and low deflection in a clevis assembly intended for weighing applications or force measurements in axially loaded members.

As shown in FIG. 5, one embodiment of a device having features of the present invention, shown generally as 100, comprises a beam 110, an array 120 including recesses 120a, 120b, 120c or blind cavities, formed in the beam, and at least one strain gage or similar strain transducer 130a, 130b, mounted in at least one recess 120a, 120b, 120c. The beam 110 is formed to increase the effective height of the device in bending, and to increase the effective radius about the lengthwise horizontal axis of the panel in torsion. The through hole 120b is used to further increase the height of the device without adding stiffness. As shown in the figure, the height of the array of recesses 120 is designated as 'h' and the length of the recess 120 is designated as 'l'. To provide high stiffness and sensitivity, the length 'l' to height 'h' ratio of the array of recesses is equal to or less than 1.0. This construction is configured for single axis measurement with high deflection sensitivity and stiffness in the primary load axis. Each recess 120a, 120c and strain transducer 130 combination is also known as an active shear panel. Desirably, the active shear panels have a length-to-height ratio of about 1.0 and, as shown in FIG. 5, may be arranged in vertical arrays wherein the shear panels are in parallel relation to one another. In a second embodiment of the present invention shown in FIG. 6, a high-stiffness, high-sensitivity device 200, having features of the present invention, may find applications, among others, in weighing applications or force measurement in axially loaded members 280. The device 200 comprises a clevis assembly 210 having a base, shown in FIG. 6 as a pair of symmetrical portions 210a, 210b, and a pair of substantially parallel arms 212a and 212b extending outward/downward from the base. Preferably, though not necessarily, the base 210a, 210b and the arms 212a, 212b are integrally formed. An array 220 of recesses 220a, 220b, and 220c is formed in each of the symmetrical base portions 210a, 210b; however, the number of recesses 220a, 220b, 220c formed in each of the symmetrical base portions 210a, 210b is not a limiting feature of this embodiment. Rather, the array 220 recesses are so formed in the base portions 210a, 210b, that each array has a length 'l' to height 'h' ratio of less than 1.0. At least one strain gage 230 is mounted within at least one recess in each base portion 210a, 210b. As in the embodiment of FIG. 5, where multiple strain gages 230 are mounted within the same array, the active shear panels are desirably in parallel relation to one another, and each has desirably (but not necessarily) an individual length-to-height ratio of 1.0.

Figure 7:
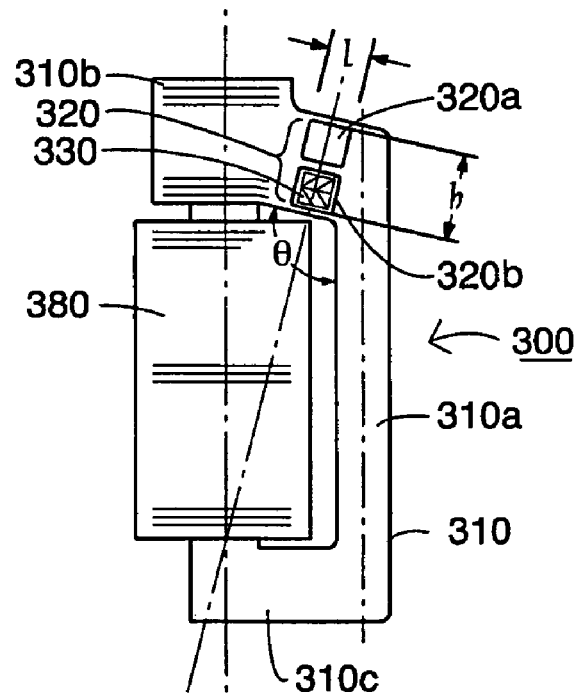
FIG. 7 depicts a third embodiment of the present invention configured for high sensitivity and stiffness in a frame assembly intended for application as a deflectometer, dilatometer, or diametric extensometer.

Turning now to FIG. 7, a further embodiment of a device having features of the present invention is directed to a high-stiffness, high-sensitivity device 300 for measuring forces of deflection in a frame assembly 380. Such a device might be used for applications such as a deflectometer, dilatometer, or diametric extensometer. This device 300 comprises a frame 310 having a base 310a with a vertical axis, and arms 310b and 310c that are spread-apart from each other and extend outwardly from the base 310a. Desirably, the arms 310b, 310c are integrally formed with the base, each arm 310b, 310c having an upper surface, a lower surface, and a free end. An array 320 of recesses 320a, 320b, is formed in at least one of the arms. Again, the array of recesses has a length to height ratio of less than 1.0. A strain gage 230 is mounted in at least one of the recesses 320a, 320b. As in the other embodiments of the present invention, when a strain gage 230 is mounted in more than one recess of an array, the active sheer panels in that array 320 are arranged in parallel relation. Depending upon the particular application, one of the arms 310b, 310c may extend outwardly from the base 310a at an obtuse angle to provide greater sensitivity to forces of deflection. The obtuse angle is defined by the vertical axis of the base and the axis formed by the lower surface of the arm. As shown in FIG. 7, arm 310b extends outwardly and upwardly from the base 310a.

Figure 8A:
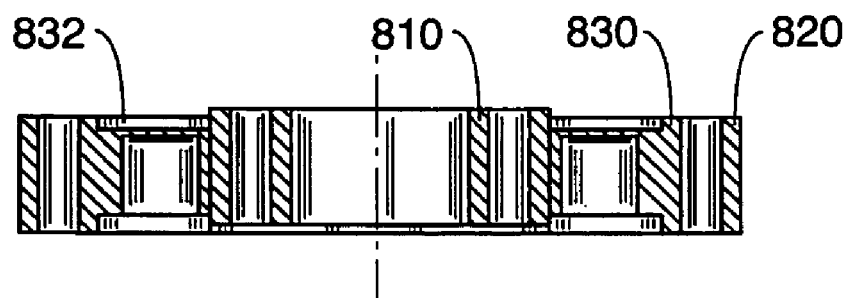
FIG. 8A is a sectional view of the device of FIG. 8 taken along Line 8A—8A.
Figure 8:
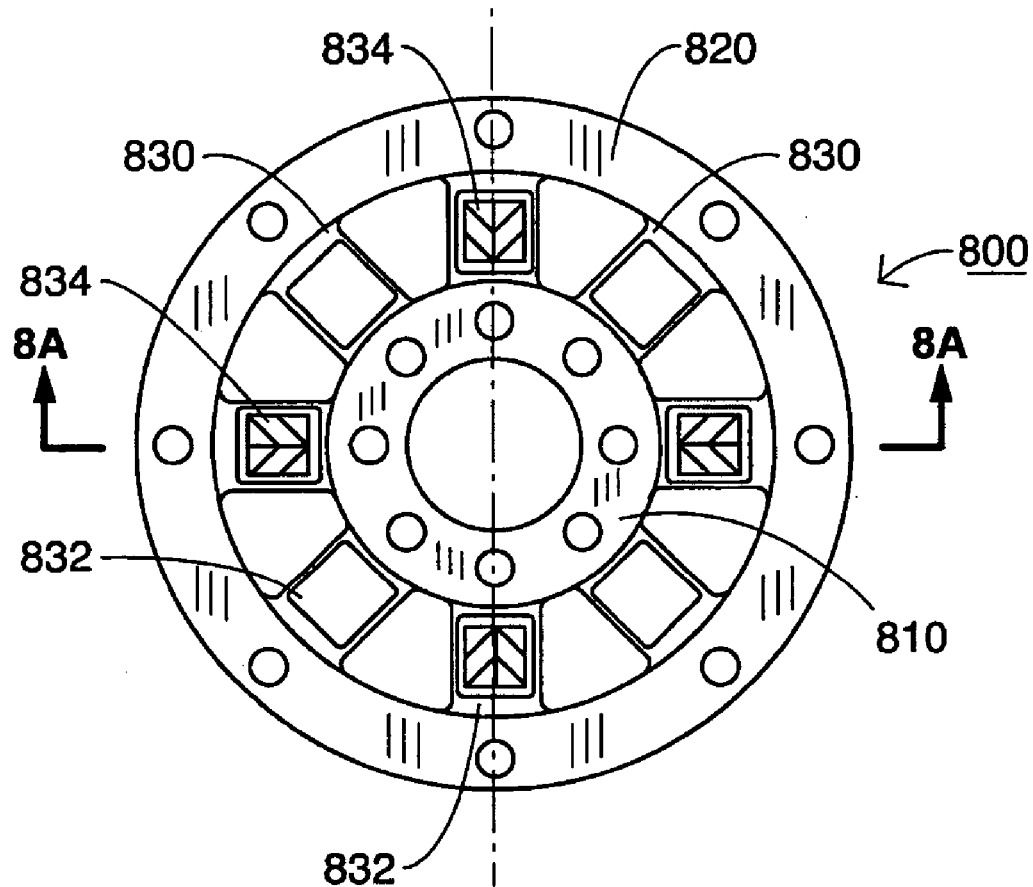
FIG. 8 depicts a fourth embodiment of the present invention configured for measuring torque about a shaft.

In another embodiment shown in FIG. 8, a high-stiffness, high sensitivity device 800 is shown for measuring torque in axial members, such as pump shafts and the like. This device 800 comprises a wheel having an inner ring 810, an outer ring 820, and a plurality of spokes 830 extending radially outward from the inner ring 810 to interconnect the inner ring 810 and outer ring 820. In a preferred embodiment, a recess 832 is formed in each one of the spokes 830. As formed, the plurality of recesses 832 are arranged in a circumferential array between the inner rings 810 and outer rings 820. Each recess has a length-to-height ratio of about 1.0 At least one measuring element 834 is mounted in alternating recesses 832. In operation, the device 800 is mounted so that the inner ring 810 is mounted about the shaft of the equipment being measured, such as a pump shaft. The outer ring is then mounted to a load source such as a motor, wherein the device is sufficiently rigid to measure torque when the shaft is loaded.

The principle of operation of the devices of the present invention is based on the fact that shear strain in a panel structure is angular displacement. The shear strain of a member is the change in an initially right angle on the panel, one side being aligned with the axis of load, and is thus a function of displacement of the loaded end of the structure and the effective length of the shear system.

Figure 1:
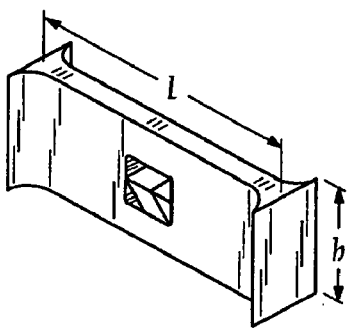
FIG. 1 illustrates a prior art rectangular beam shear element as conventionally used in force and torque measurements.
Figure 2:
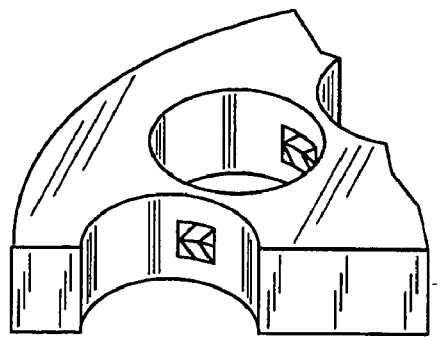
FIG. 2 illustrates a prior art shear element formed by cylindrical bores in the axis of loading.
Figure 3:
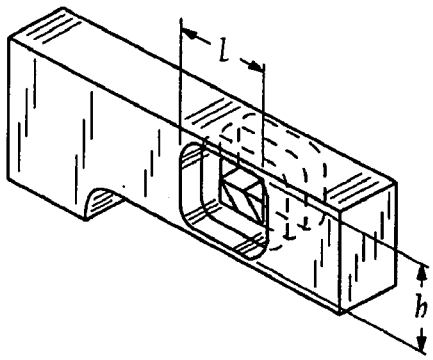
FIG. 3 illustrates a prior art beam shear element with a panel formed by blind cylindrical bores transverse to the load axis as conventionally used in force and torque measurements.
Figure 4:
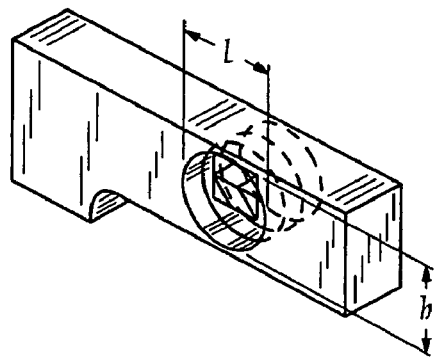
FIG. 4 illustrates a prior art flanged beam shear element with a panel formed by blind cylindrical bores transverse to the load axis as conventionally used in force and torque measurements.
Figure 9:
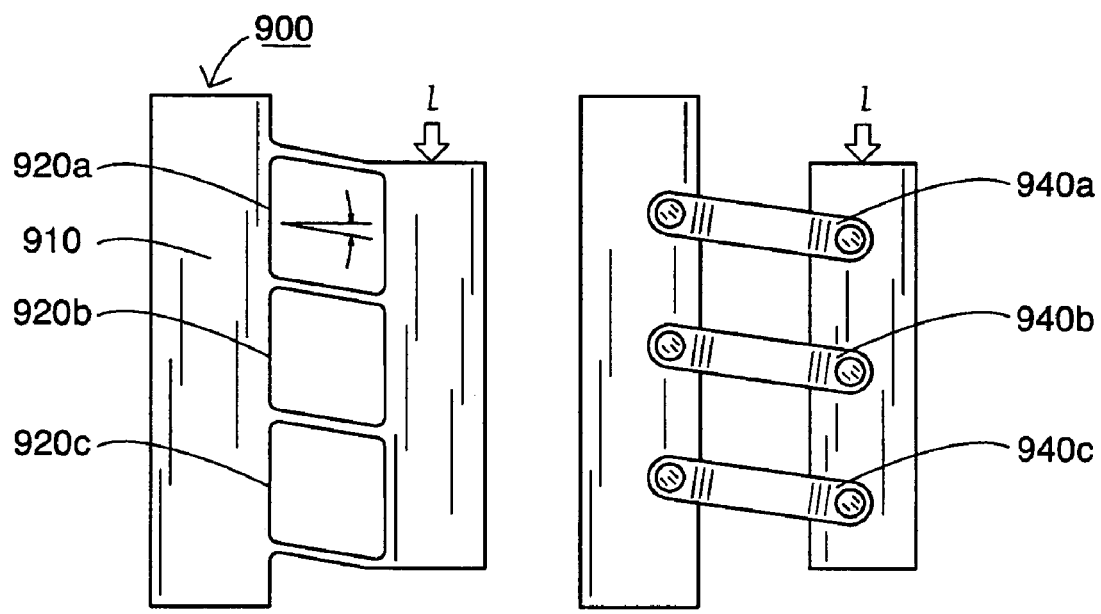
FIG. 9 illustrates an analogy of the strain behavior of a parallel system of active shear panels to the motion produced by a system of parallel links.

Although it is widely known that an unmeasured load path within or in parallel with a strain element typically produces a statically indeterminate structure with low stability and poor precision, it can be easily seen by an analysis of the structures shown in FIG. 5, that high-stiffness shear structures can, within reason and good design practice, be constructed with multiple parallel stages without encountering these effects. Where a conventional shear beam cell, as in FIGS. 3 and 4, would become problematically flexible and subject to bending stresses as it was scaled down to reduce the length of the shear system, the parallel system of the disclosed structure can be of any height and stiffness without limitation on the shear system length other than the practical considerations of strain elements and wiring. The above can be modeled as a simple system of parallel links, as shown in FIG. 9. Shortening the links 940a, 940b, 940c (corresponding to active shear panels 920a, 920b, 920c) increases the angle at which they are displaced to produce a given vertical motion of the movable end. Likewise, shortening a shear structure produces a higher angular strain, and therefore a higher surface shear strain, for a given displacement. That is, angular shear strain $\gamma$ is related to $\tau$, the unit surface shear strain normally used as the metric property of a shear strain element; i.e., $\tau=\gamma/2$, where $\gamma$ is expressed in radians.

As an additional benefit, since each part of a shear structure experiences the same shear stress, provided displacements are small enough that bending is negligible, not all sections of the system must be instrumented. Additional panels or beams can be added to stiffen and control the structure without further complicating the strain gage circuit, so long as effective length-to-height ratios are kept low (less than 1.0) to avoid bending stresses.

These mechanisms can be combined into more complex structures, producing high-sensitivity, low-deflection designs for applications such as torsion instruments and multi-axis cells. Since high spring rates can be achieved without sacrificing sensitivity, this mechanism will also work well in summed multi-segment devices, such as a group of instrumented supports that carry the force delivered by a large linear actuator that is normally bolted in place by interposing a separate instrument between the actuator and structure.

Although the present invention has been described with exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

I claim:

1. A device for measuring forces or deflection on a sensor body, comprising:
    (a) a beam having a length and a height, the height defining a load axis;
    (b) an array comprising a plurality of recesses formed in the beam, wherein the array is substantially parallel to the load axis and has a length-to-height ratio of less than 1.0; and
    (c) a strain measuring element mounted in at least one recess, wherein when incorporated on a sensor body the device is sufficiently rigid to provide low overall deflection when a load is applied along the load axis, while providing adequately high metric strain levels.

2. The device of claim 1 wherein the array of recesses is vertically-oriented.

3. The device of claim 2 wherein the length-to-height ratio of the array is about 0.5.

4. The device of claim 2 wherein the length-to-height ratio of the array is about 0.3.

5. The device of claim 1 wherein strain measuring elements are mounted in more than one recess of the array of recesses, and the measuring elements are arranged in parallel relation.

6. The device of claim 1 wherein each recess of the array of recesses has a length to height ratio of about 1.0.

7. The device of claim 1 where the measuring element is a strain element.

* * * * *